US010054965B2

(12) United States Patent
Lucas et al.

(10) Patent No.: US 10,054,965 B2
(45) Date of Patent: Aug. 21, 2018

(54) ANALOG/DIGITAL INPUT ARCHITECTURE HAVING PROGRAMMABLE ANALOG OUTPUT MODE

(71) Applicant: Honeywell International Inc., Morristown, NJ (US)

(72) Inventors: Jeffrey David Lucas, Akron, OH (US); Victor Allen Camp, Orrville, OH (US); Eric B. Williams, Tallmadge, OH (US)

(73) Assignee: Honeywell International Inc., Morris Plains, NJ (US)

( * ) Notice: Subject to any disclaimer, the term of this patent is extended or adjusted under 35 U.S.C. 154(b) by 421 days.

(21) Appl. No.: 14/819,967

(22) Filed: Aug. 6, 2015

(65) Prior Publication Data

US 2017/0038782 A1 Feb. 9, 2017

(51) Int. Cl.
*G05F 1/10* (2006.01)
*H02M 3/156* (2006.01)

(52) U.S. Cl.
CPC .............. *G05F 1/10* (2013.01); *H02M 3/156* (2013.01)

(58) Field of Classification Search
CPC ......... G05F 1/10; H02M 3/156; H03M 1/004; H03M 1/12; H03M 1/66; H03M 3/00; H01L 29/00
USPC .......................................................... 700/298
See application file for complete search history.

(56) References Cited

U.S. PATENT DOCUMENTS 3,836,821 A * 9/1974 Wahlgren ............... H02H 3/331 361/45
4,437,146 A * 3/1984 Carpenter ........... H02M 1/4225 323/222
5,483,141 A * 1/1996 Uesugi .................. F25B 49/025 318/599
5,820,744 A * 10/1998 Edwards .................. B23H 3/02 204/224 M
5,837,891 A * 11/1998 Bridge ................ B60C 23/0433 116/34 R
6,308,231 B1 * 10/2001 Galecki ................ G05B 19/054 702/127
6,618,628 B1 * 9/2003 Davlin ............... G05B 19/0421 700/20

(Continued)

OTHER PUBLICATIONS

Novar "rcc.1081 Installation Instructions", 2014 (Year: 2014).*

(Continued)

*Primary Examiner* — Jason D Mitchell
(74) *Attorney, Agent, or Firm* — Brooks, Cameron & Huebsch, PLLC

(57) ABSTRACT

Apparatuses and systems for analog/digital input architecture having programmable analog output mode are described herein. One apparatus includes a current source component to create a current source, a pulse-width modulation (PWM) control component to implement an analog output mode, wherein the analog output mode is implemented on a same input/output terminal as at least one other device mode, a dither input component to receive a dither signal, a current shunt component to create an input shunt, a resistance/thermistor input pull-up component to provide an excitation voltage, a voltage/current input scaling component to provide input prescaling, an input protection component to protect at least one port of the apparatus from damage, and an input filter component to provide filtering to high frequency noise.

18 Claims, 3 Drawing Sheets

(56) References Cited

U.S. PATENT DOCUMENTS 6,697,685 B1 * 2/2004 Caldwell .............. G05B 19/042 134/57 D
6,800,965 B1 * 10/2004 Turner ................... H01H 1/605 307/128
7,208,975 B1 * 4/2007 Agrawal .......... H03K 19/17736 326/38
7,626,837 B2 * 12/2009 De La Torre ..... H02M 3/33546 363/41
7,844,764 B2 * 11/2010 Williams ............. F24F 11/0009 700/19
7,903,106 B2 * 3/2011 Lan ...................... G09G 3/3696 345/204
7,964,992 B2 * 6/2011 Apfel .................... H02M 3/156 307/82
2002/0075710 A1 * 6/2002 Lin ....................... H02M 3/156 363/127
2005/0219868 A1 * 10/2005 Inukai ............... H02M 3/33561 363/20
2005/0235028 A1 * 10/2005 Kirschner ........... H03M 1/0621 708/800
2006/0063508 A1 * 3/2006 He ........................... H03F 3/24 455/341
2006/0083037 A1 * 4/2006 Leung ............... H02M 3/33576 363/98
2006/0220938 A1 * 10/2006 Leung ............... H02M 3/33515 341/155
2006/0244432 A1 * 11/2006 Grabinger ............... H02M 1/08 323/282
2007/0109171 A1 * 5/2007 Mallinson .......... H03K 17/6872 341/155
2008/0129263 A1 * 6/2008 Kotikalapoodi ...... H02M 3/157 323/283
2008/0303517 A1 * 12/2008 Skultety-Betz ........ G01V 3/104 324/234
2009/0121908 A1 * 5/2009 Regier ............... G01R 31/2841 341/142
2009/0195230 A1 * 8/2009 Adkins ................. H02M 3/156 323/282
2009/0198386 A1 * 8/2009 Kim ........................ H02P 9/102 700/298
2010/0013450 A1 * 1/2010 Huang .................... H02M 1/32 323/282
2010/0066169 A1 * 3/2010 Apfel .................... H02M 3/156 307/31
2011/0187572 A1 * 8/2011 Brocke ............... H03M 1/1028 341/144
2014/0049528 A1 * 2/2014 Koo ......................... G09G 5/20 345/208
2014/0103993 A1 * 4/2014 Chen ......................... G05F 1/46 327/540
2014/0333279 A1 * 11/2014 Hagemeyer ............ H04B 3/548 323/299
2014/0375383 A1 * 12/2014 Silver ................... H02M 3/156 330/127
2016/0091908 A1 * 3/2016 Edwards ................... G05F 1/56 323/274
2016/0154415 A1 * 6/2016 B z itu .................... G05F 1/575 323/280
2016/0238658 A1 * 8/2016 Edwards ............ G01R 31/3278
2016/0344401 A1 * 11/2016 La Grou ................. H03M 1/08

OTHER PUBLICATIONS

Emerson Climate Technologies. "Emerson's E2 RX series Refrigeration control systems". 2006. Accessed from: http://www.emersonclimate.com/Documents/Retail%20Solutions/Product%20Cut%20Sheets/2006RS-118%20R2%20E2RX.pdf. 4 pages.
Novar. "Opus rcc.1081". Oct. 2014. Accessed from: http://www.novar.com/downloads/Cut%20Sheets%20Collateral/rcc1081-Sell-Sheet.pdf. 2 Pages.
Johnson Controls. "Controls, Hvac & Refrigeration Products". 2013. Accessed from: http://www.partscenter.co.uk/wcsstore7.00.287.34/ExtendedSitesCatalogAssetStore/images/products/AssetPush/DTP_AssetPushHighRes/std.lang.all/hu/re/Johnson%20Controls_Brochure.pdf. 237 pages.
"Einstein RX Refrigeration Controller User's Guide". Apr. 10, 2001. Accessed from: http://www.emersonclimate.com_Documents_RetailSolutions_ 026-1601Rev3.PDF. 229 pages.
Novar. "AOM Product Description". Accessed from http://www.novar.com/technology/logic-one-technology/item/aom.2013. 2 pages.

* cited by examiner

ANALOG/DIGITAL INPUT ARCHITECTURE HAVING PROGRAMMABLE ANALOG OUTPUT MODE

TECHNICAL FIELD

The present disclosure relates to apparatuses and systems for analog/digital input architecture having programmable analog output mode.

BACKGROUND

Buildings may contain building systems. One such system, for example, is a large scale refrigeration system. In a refrigeration system, one or more rooms (commonly referred to as "refrigeration racks") can contain compressors, fans, and/or associated control circuitry (e.g., control modules). Refrigeration racks may be custom built to customer specifications by a designer and/or manufacturer.

Previous control modules may have taken advantage of once-larger refrigeration racks having surplus space. With less of a premium placed on space, previous control modules could provide reduced (e.g., one or two) functions per module (e.g., relay outputs, analog outputs, and digital and/or analog outputs).

As physical space provided for control modules continues to become more limited, previous control modules may be rendered too large for installation. An installer and/or designer may find inadequate space in a refrigeration rack to install a number of previous control modules that have a desired mix of fixed input/output functions under previous approaches.

DETAILED DESCRIPTION

Figure 1:
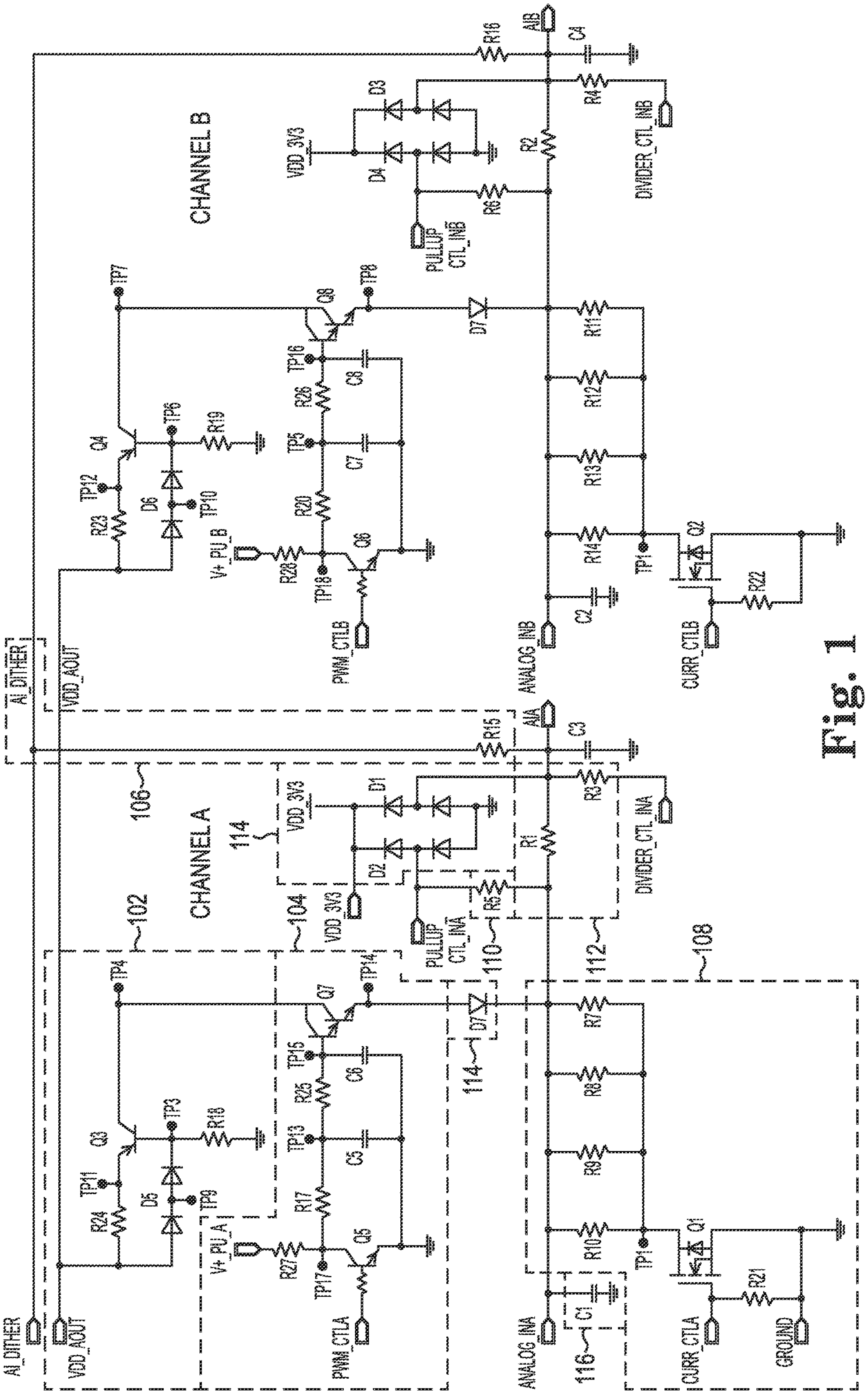
FIG. 1 illustrates an apparatus including analog/digital input architecture having programmable analog output mode in accordance with one or more embodiments of the present disclosure.

Apparatuses and systems for analog/digital input architecture having programmable analog output mode are described herein. For example, one or more embodiments include a current source component to create a current source, a pulse-width modulation (PWM) control component to implement an analog output mode, wherein the analog output mode is implemented on a same input/output terminal as at least one other device mode, a dither input component to receive a dither signal, a current shunt component to create an input shunt, a resistance/thermistor input pull-up component to provide an excitation voltage, a voltage/current input scaling component to provide input prescaling, an input protection component to protect at least one port of the apparatus from damage, and an input filter component to provide filtering to high frequency noise.

Embodiments of the present disclosure can minimize a number of fixed function input/output (I/O) points by providing a flexible yet easily configurable architecture that allows multiple I/O types and modes of operation on the same terminal (e.g., pin). To do so, embodiments of the present disclosure can combine an analog output mode with input architecture. Embodiments herein can be employed in refrigeration contexts and/or elsewhere. Some embodiments can control a refrigeration system and/or a heating, ventilation, and air conditioning (HVAC) system, for instance.

Various universal input structures that embody previous approaches may make use of an increasing number of I/O port pins and high resolution analog/digital inputs available in controllers (e.g., microcontrollers). Typically, port pins can be arranged to control the various modes of operation of the input. Through executable instructions (e.g., software), analog inputs can be used for analog and/or digital inputs, while the I/O port pins enable pull-up resistors for resistance measurements, divider circuits for voltage and/or digital measurements, and, through the use of ultra low-on resistance metal-oxide-semiconductor field-effect transistors (MOSFETS), enable shunt resistors for current measurement.

However, previous approaches are met with drawbacks. For example, in digital input modes, the use of the resistance measurement pull up for dry contact type inputs may provide merely micro amps of wetting current (e.g., approximately 300 micro amps). As a result, measurement reliability may be compromised when certain (e.g., inferior) contact material us used for the input source, such as in inexpensive door switches, for instance. Additionally, the digital input open circuit voltage in previous approaches may be fixed at the level of pull-up supply voltage (e.g., 3.3 volts). Further, the lack of an analog output mode may result in the inclusion of additional fixed function outputs, which may increase the overall control module size and/or cost, or which may impel the use of additional fixed function control modules to be added to a control system.

Embodiments of the present disclosure can leverage one or more integrated timer counter functions multiplexed on controller I/O port pins to include a pulse width modulated (PWM) analog output mode in the input architecture of the controller. Accordingly, input enhancements can be realized with a reduction in the increase of cost and/or size. For example, embodiments of the present disclosure can provide a precision closed loop (e.g., 0V-10V) analog output mode; approximately 10 milliamps of wetting current for digital and/or dry contact type inputs; adjustable open circuit voltage for digital and/or dry contact digital inputs; and/or adjustable DC level for use with digital solid state relays.

The programmable analog output mode, in accordance with one or more embodiments described herein, can be implemented using a PWM signal. The PWM signal can be programmed using a frequency and/or pulse width that allows filtering components to provide a voltage output with reduced (e.g., minimal) ripple. The programmable analog output mode can be run in a calibrated open loop mode and/or can use proportional-integral-derivative (PID) loop control with voltage feedback, for instance. In some embodiments, the voltage mode of the input can be used for feedback in PID loop control.

In some embodiments, the output voltage can be a continuously variable output (e.g., from 0V-10V). In some embodiments, the output voltage can be used for other applications, such as driving a solid state relay, for instance, using two output levels (e.g., 0V and 5V).

The analog output mode can be implemented without manual hardware configuration. In some embodiments, the PWM output from the controller, when driven to an "off" state, can allow the analog input to function normally.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of blocks" can refer to one or more blocks.

FIG. 1 illustrates an apparatus 100 including analog/digital input architecture having programmable analog output mode in accordance with one or more embodiments of the present disclosure. The apparatus 100 can be (or be a portion of) a controller (e.g., a microcontroller), for instance. The apparatus 100 can be implemented on a printed circuit board (PCB), though embodiments of the present disclosure are not so limited. The apparatus 100 can be one half of a block containing two complete universal inputs, for instance. That is, in some embodiments, the apparatus 100 can represent one channel of a dual channel block.

The apparatus 100 can include a current source component 102. The current source component 102 can include one or more resistors, transistors, and/or diodes configured to create a current source (e.g., a simple current source). The current source can be used to limit an analog output maximum drive current and/or a digital input wetting current. In the embodiment illustrated in FIG. 1, the current source component 102 includes a current set resistor R24, which can set the output current to approximately 30 milliamps. Due to increased dissipation of transistor Q3 at this current, a low saturation transistor can be used to increase the dissipation capability of R24. In some embodiments, the maximum current can be set to approximately 12 milliamps (by a resistance of R24 being 40.2 Ohms) thereby reducing (e.g., minimizing) the maximum dissipation of the transistor Q3 and allowing a less expensive transistor to be used.

The apparatus 100 can include a PWM control component 104. The PWM control component 104 can implement the analog output mode (discussed further below). The PWM control component 104 can provide a voltage gain to the 1 KHz PWM output of the apparatus (PWM_CTLA) through transistor Q5 and resistor R27, for instance. A two pole passive filter comprised of resistors R17, R25, capacitors C5 and C6 can provide a frequency roll-off of approximately −6 db at 10 Hz. A Darlington transistor Q7 can provide gain to the high impedance post filter DC signal. The full scale range of the output can be determined by the supply rail (VDD_AOUT) and transistor Q5 pull up supply (V+_PU_A).

The apparatus 100 can include a dither input component 106. The dither input component 106 can receive a dither signal (AI_DITHER) (e.g., 50 Hz at 50% duty cycle) through resistor R15. The dither signal can be used in one or more (e.g., all) universal input (UI) modes of operation. When implemented with software oversampling, an increase in analog-to-digital (A/D) resolution can be obtained. In cases where dither is not desired, the port pin (e.g., one of a plurality of port pins) of the apparatus can be set to a high impedance state, for instance, to prevent loading of the measurement system.

The apparatus 100 can include a current shunt component 108. The current shunt component 108 can create an input shunt, for instance. When on, low $R_{DS(ON)}$ field-effect transistor Q1 can provide 5 Ohms (e.g., a maximum of 5 Ohms) series resistance to parallel resistors R7, R8, R9, and R10, thereby creating an approximately 525 Ohm input shunt. In cases where current input mode is selected, the current shunt component 108 can be switched on by a processor signal (CURR_CTLA). For example, the current shunt component 108 can convert an input signal of 4 to 20 milliamps to approximately 2 to 10 V (DC). The current shunt component 108 can be sized to 2 W allowing a continuous application of 28V AC to the input terminals without damage to the apparatus 100. During a reset of the apparatus 100, a gate resistor R21 can hold transistor Q1 off, for instance.

The apparatus 100 can include a resistance/thermistor input pull-up component 110 (hereinafter "pull-up component 110"). Pull-up component 110 can provide an excitation voltage for a thermistor and/or for general purpose resistance input measurements. A source voltage for the pull-up component 110 can be derived from control pin PULLUP_CTL_INA, for instance, and can be set at a particular (e.g., high) level when resistance or thermistor mode is selected. In some embodiments, the source voltage can be set to approximately 3.3 V when resistance or thermistor mode is selected. To provide ratio metric performance of the analog input, the power supply for the apparatus 100 can be derived from a same regulator used as the A/D voltage reference. During voltage, current, and/or digital modes, PULLUP_CTL_INA can be set to a high impedance state to prevent the pin from inducing measurement errors. In cases where the input is used as the analog output, the signal can be set to logic 0 and can provide a minimum load for the output (e.g., to allow conduction of diode D7 when the output is driving high impedance inputs).

The apparatus 100 can include a voltage/current input scaling component 112. The voltage/current input scaling component 112 can include resistors R1 and R3, for instance, configured as an input prescaler (e.g., that provides input prescaling) when the universal input is in voltage, current, analog output, and/or digital input modes. The prescaler can be enabled by setting UI control signal DIVIDER_CTL_INA to logic 0 (e.g., approximately 0 V DC), which completes the circuit of the R1/R3 voltage divider. Full scale voltages up to 11.12 V may be measured by the analog input when a 3.3 V reference is used by the A/D. In cases where the input is placed in resistance/thermistor mode, the prescaler can be disabled by placing DIVIDER_CTL_INA in a high impedance state.

The apparatus 100 can include an input protection component 114. The input protection component 114 can include a plurality of diodes, resistors, and/or transistors (e.g., a substrate diode portion), which can protect at least one port (e.g., the universal input and port(s)) of the apparatus 100 from damage under continuous application of 28 V AC and/or transient application in excess of 28 V AC. Duodiodes D1 and D2 can divert voltages greater than nominal +4 V to VDD_3V3 and negative voltages to ground. Substrate diode portion Q1 can divert negative current (e.g., AC input from wiring error) to ground. Resistor R1 can be employed as a current limiter, for instance.

The apparatus 100 can include an input filter component 116. The input filter component can provide filtering to high frequency noise and/or transients (e.g., via C1 (0.068 μF/100 V)). That is, the input filter component 116 can filter out high frequency noise and/or transients. In some embodiments, the input filter component 116 can include an additional capacitor (e.g., C3 (0.47 μF)) to provide filtering to frequencies above 20 Hz (e.g., a digital pulse counting limit).

Figure 2:
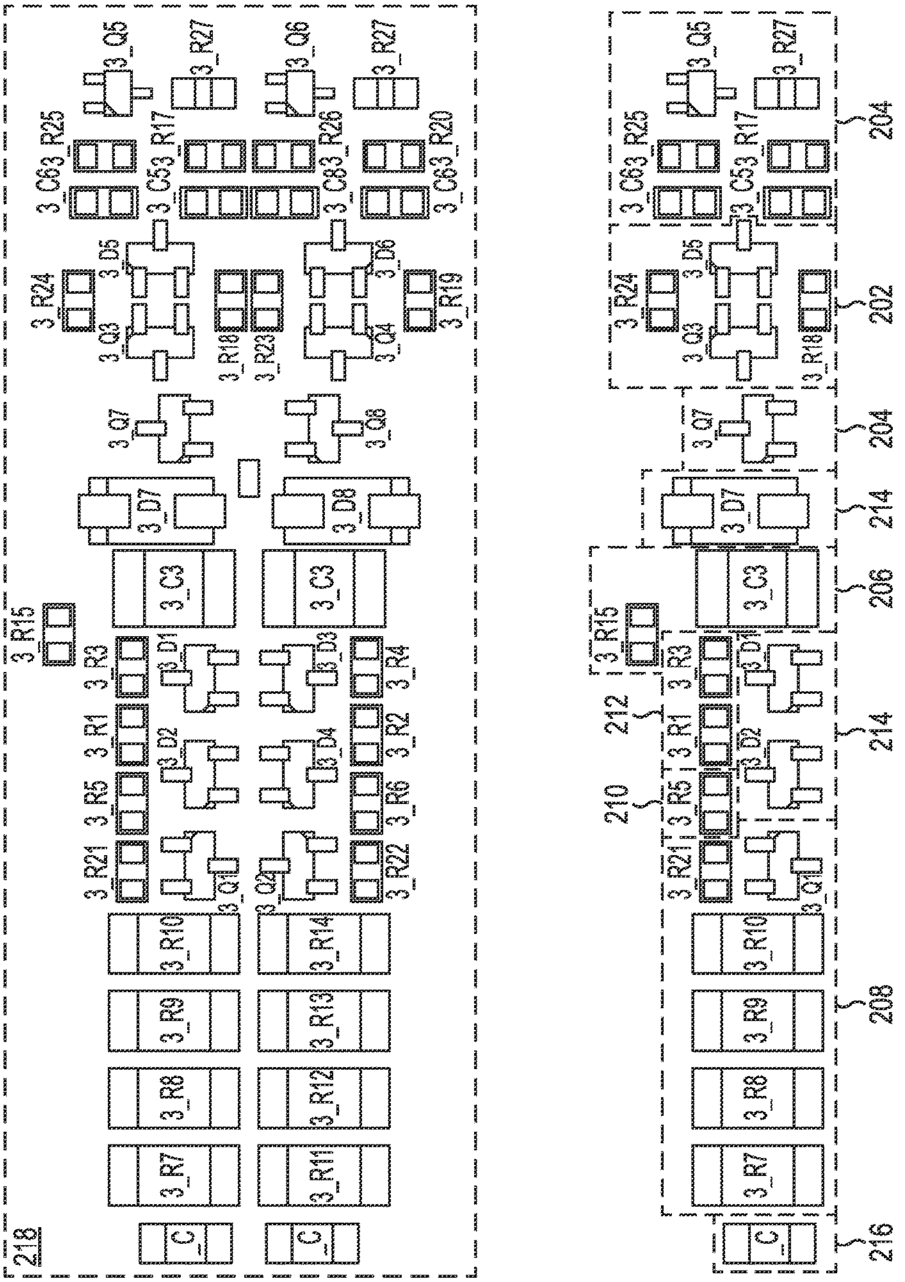
FIG. 2 illustrates a dual channel apparatus including analog/digital input architecture having programmable analog output mode in accordance with one or more embodiments of the present disclosure.

FIG. 2 illustrates a dual channel apparatus 218 including analog/digital input architecture having programmable analog output mode in accordance with one or more embodiments of the present disclosure. The apparatus 218 can contain two universal inputs, for instance. That is, in some embodiments, the apparatus 100 can include both channels of a dual channel block.

As shown in FIG. 2, the apparatus 218 includes two portions, each analogous to the apparatus 100, previously described in connection with FIG. 1. For instance, each portion includes a current source component 202, a PWM control component 204, a dither input component 206, a current shunt component 208, a pull-up component 210, a voltage/current input scaling component 212, an input protection component 214, and an input filter component 216. For purposes of clarity, only one of the portions (channels) of the apparatus 218 is accompanied by reference numerals in FIG. 2.

As previously discussed, the dual channel apparatus 218 can be formed on a substrate (e.g., a PCB). In some embodiments, a width of the dual channel apparatus 218 can be approximately 0.75 inches (e.g., 0.74-0.76 inches). In some embodiments, a length of the dual channel apparatus 218 can be approximately 2.15 inches (e.g., 2.14-2.16 inches). In some embodiments, a PCB can include a plurality of dual channel apparatuses 218. For example, a PCB having a width of 5 inches and a length of 7 inches can include 8 dual channel apparatuses 218.

Figure 3:
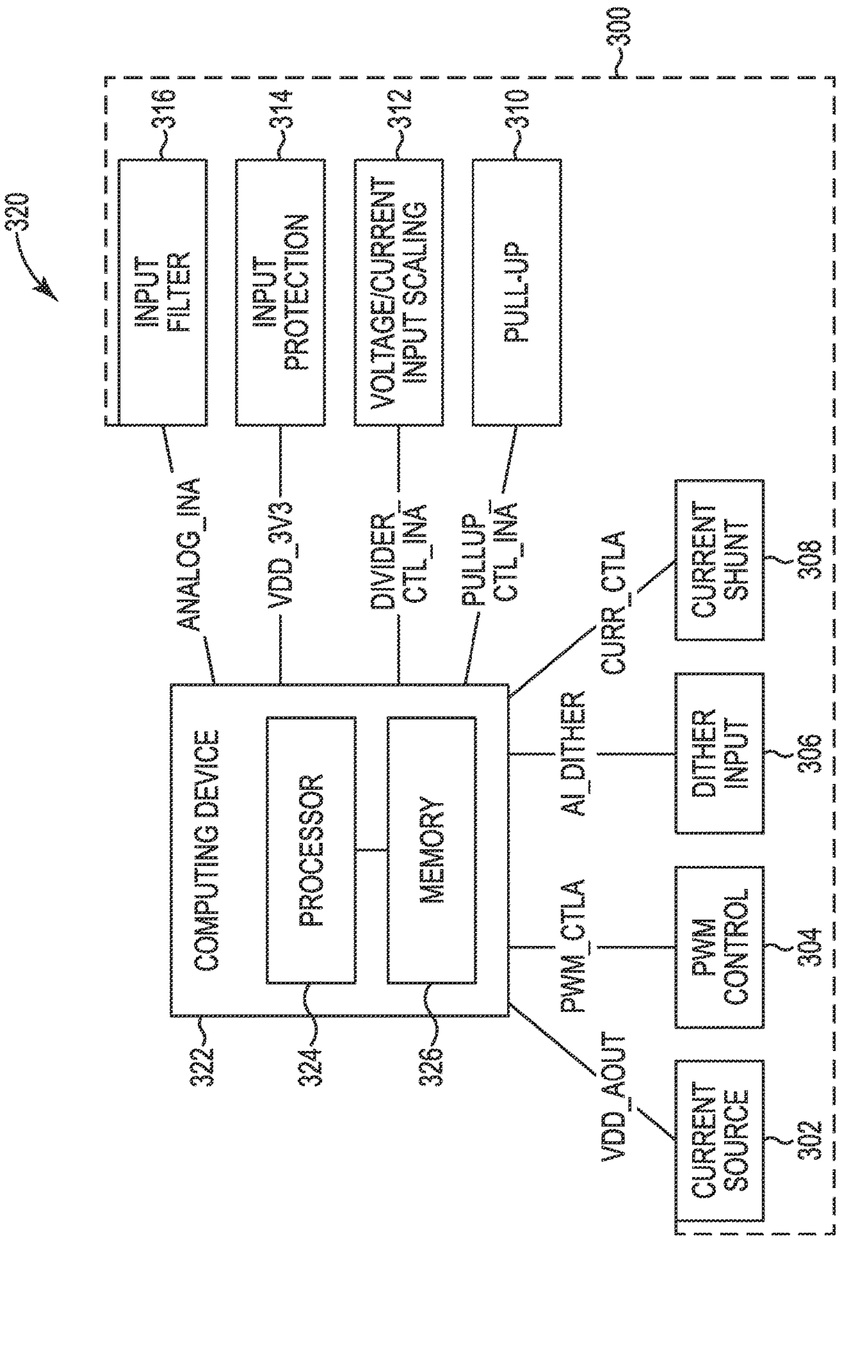
FIG. 3 illustrates a system including operating analog/digital input architecture having programmable analog output mode in accordance with one or more embodiments of the present disclosure.

FIG. 3 illustrates a system 320 including operating analog/digital input architecture having programmable analog output mode in accordance with one or more embodiments of the present disclosure. System 320 includes a computing device 322. Computing device 322 can be, for example, a laptop computer, a desktop computer, or a mobile device (e.g., a mobile phone, a personal digital assistant, etc.), among other types of computing devices.

As shown in FIG. 3, computing device 322 includes a memory 326 and a processor 324 coupled to memory 326. Memory 326 can be any type of storage medium that can be accessed by processor 324 to perform various examples of the present disclosure. For example, memory 326 can be a non-transitory computer readable medium having computer readable instructions (e.g., computer program instructions) stored thereon that are executable by processor 324 to operate input circuitry with programmable analog output in accordance with one or more embodiments of the present disclosure.

Memory 326 can be volatile or nonvolatile memory. Memory 326 can also be removable (e.g., portable) memory, or non-removable (e.g., internal) memory. For example, memory 326 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 326 is illustrated as being located in computing device 322, embodiments of the present disclosure are not so limited. For example, memory 326 can also be located internal to another computing resource (e.g., enabling computer readable instructions to be downloaded over the Internet or another wired or wireless connection).

In addition to, or in place of, the execution of executable instructions, various examples of the present disclosure can be performed via one or more devices (e.g., one or more controllers) having logic. As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor. It is presumed that logic similarly executes instructions for purposes of the embodiments of the present disclosure.

The computing device 322 can communicate with a plurality of components of an apparatus 300. The computing device 322 can be local with respect to the apparatus 300, for instance. The computing device 322 can be remote with respect to the apparatus 300, for instance. In some embodiments, the components may be analogous to the components discussed in connection with FIGS. 1 and/or 2; in some embodiments, the apparatus 300 may be analogous to the apparatus 100 and/or the apparatus 200 respectively discussed in connection with FIGS. 1 and/or 2. That is, the components of system 320 can include a current source component 302, a PWM control component 304, a dither input component 306, a current shunt component 308, a pull-up component 310, a voltage/current input scaling component 312, an input protection component 314, and/or an input filter component 316 (cumulatively referred to as "components 302-316").

The apparatus 300 (which can be defined by the components 302-316) can enter a plurality of modes. In some embodiments, the plurality of modes can include, for example, a current mode, a resistance mode, a voltage mode, a digital/pulse counting mode, and/or an analog output mode. The memory 326 can include instructions executable by the processor 324 to cause the apparatus to enter a particular mode of a plurality of modes by causing a modification of an operation of at least one of the components 302-316.

In the current mode, the apparatus 300 can be configured to determine (e.g., detect, measure, acquire, etc.) a current. To enter the current mode, the memory 326 can include instructions executable by the processor 324 to set a logic level of the current shunt component 308 to high via a CURR_CTLA control line connected to the current shunt component 308. The memory 326 can include instructions executable by the processor 324 to set a logic level of the voltage/current input scaling module 312 to low via a DIVIDER_CTL_INA control line connected to the voltage/current input scaling module 312. The memory 326 can include instructions executable by the processor 324 to set a duty cycle of the PWM control module 304 to a lowest setting (e.g., minimum) via a PWM_CTLA control line connected to the PWM control module 304. The memory 326 can include instructions executable by the processor 324 to set a logic level of the pull-up component 310 to highZ via a PULLUP_CTL_INA control line connected to the pull-up component 310.

By way of example and not limitation, the below table illustrates further details associated with the current mode.

| | |
|---|---|
| Minimum Measurable Range | 3.5 ma to 20.5 ma |
| Accuracy | Not less than +/−1% of span |
| Resolution | Not less than 16 uA/bit |
| Compliance | Input shall support current loop devices having a loop compliance of 10 V or less |
| Total Input Impedance | 523 ohms (+/−10%) |

In the resistance mode, the apparatus 300 can be configured to determine a resistance. To enter the resistance mode, the memory 326 can include instructions executable by the processor 324 to set a logic level of the current shunt component 308 to low via a CURR_CTLA control line connected to the current shunt component 308. The memory 326 can include instructions executable by the processor 324 to set a logic level of the voltage/current input scaling module 312 to highZ via a DIVIDER_CTL_INA control line connected to the voltage/current input scaling module 312. The memory 326 can include instructions executable by the processor 324 to set a duty cycle of the PWM control module 304 to a lowest setting (e.g., minimum) via a PWM_CTLA control line connected to the PWM control module 304. The memory 326 can include instructions executable by the processor 324 to set a logic level of the pull-up component 310 to high via a PULLUP_CTL_INA control line connected to the pull-up component 310.

By way of example and not limitation, the below table illustrates further details associated with the resistance mode.

| | |
|---|---|
| Operating Range | 100 ohms to 100K ohms |
| Accuracy | 2% of Reading |
| Precision (max.) | 100-1K, 0.5 ohms 1K-10K, 4 ohms 10K-50K, 50 ohms 50K-100K, 350 ohms |
| Out of Range Detection | Outside the range 100-100K ohms |
| Thermal Drift | 0.02% per C. (−20 C.-60 C.) |

In the voltage mode, the apparatus 300 can be configured to determine a voltage. To enter the voltage mode, the memory 326 can include instructions executable by the processor 324 to set a logic level of the current shunt component 308 to low via a CURR_CTLA control line connected to the current shunt component 308. The memory 326 can include instructions executable by the processor 324 to set a logic level of the voltage/current input scaling module 312 to low via a DIVIDER_CTL_INA control line connected to the voltage/current input scaling module 312. The memory 326 can include instructions executable by the processor 324 to set a duty cycle of the PWM control module 304 to a lowest setting (e.g., minimum) via a PWM_CTLA control line connected to the PWM control module 304. The memory 326 can include instructions executable by the processor 324 to set a logic level of the pull-up component 310 to highZ via a PULLUP_CTL_INA control line connected to the pull-up component 310.

By way of example and not limitation, the below table illustrates further details associated with the voltage mode.

| | |
|---|---|
| Minimum Measurable Range | 0.5 to 10.5 VDC |
| Accuracy | Not less than +/−2% of span |
| Resolution | Not less than 10 mV/bit |
| Total Input Impedance | >10K ohms |

In the digital/pulse counting mode, the apparatus 300 can be configured to determine a number of pulses received over a particular period of time, for instance. To enter the digital/pulse counting mode, the memory 326 can include instructions executable by the processor 324 to set a logic level of the current shunt component 308 to low via a CURR_CTLA control line connected to the current shunt component 308. The memory 326 can include instructions executable by the processor 324 to set a logic level of the voltage/current input scaling module 312 to low via a DIVIDER_CTL_INA control line connected to the voltage/current input scaling module 312. The memory 326 can include instructions executable by the processor 324 to set a duty cycle of the PWM control module 304 to a particular percentage (e.g., between 0% and 100%) based on a determined wetting voltage via a PWM_CTLA control line connected to the PWM control module 304. The memory 326 can include instructions executable by the processor 324 to set a logic level of the pull-up component 310 to highZ via a PULLUP_CTL_INA control line connected to the pull-up component 310.

By way of example and not limitation, the below table illustrates further details associated with the digital/pulse counting mode.

| | |
|---|---|
| Maximum Measurable Frequency | 20 Hz (50% duty cycle) |
| Open Circuit Voltage | Programmable (3.3-10 V) |
| Wetting Current | Input shall have a dry contact wetting current of not less than 10 mA |
| Total Input Impedance | >10K ohms |
| Counter capability | 32 bits |

In the analog output mode, the apparatus 300 can be configured to provide an analog output. To enter the analog output mode, the memory 326 can include instructions executable by the processor 324 to set a logic level of the current shunt component 308 to low via a CURR_CTLA control line connected to the current shunt component 308. The memory 326 can include instructions executable by the processor 324 to set a logic level of the voltage/current input scaling module 312 to low via a DIVIDER_CTL_INA control line connected to the voltage/current input scaling module 312. The memory 326 can include instructions executable by the processor 324 to set a duty cycle of the PWM control module 304 to a particular percentage (e.g, between 0% and 100%) based on an analog output set point via a PWM_CTLA control line connected to the PWM control module 304. The memory 326 can include instructions executable by the processor 324 to set a logic level of the pull-up component 310 to low via a PULLUP_CTL_INA control line connected to the pull-up component 310.

By way of example and not limitation, the below table illustrates further details associated with the analog output mode.

| | |
|---|---|
| Minimum Output Range | 0.1 to 10.5 VDC |
| Accuracy | Not less than +/−2% of span |

-continued

| | |
|---|---|
| Resolution | Not greater than 100 mV/bit |
| Load Impedance | >1K ohms |
| Maximum Source Current | Not less than 10 mA |

In some embodiments, control lines associated with other aspects of the apparatus 300 (e.g., other components) can be held constant, for instance. For example a control line associated with the input protection component 314 (VDD_3V3) can be set at a particular supply voltage (e.g., +3.3 V DC). A control line associated with the current source component 302 (VDD_AOUT) can be set at a particular supply voltage (e.g., +15 V DC). A control line associated with a pull-up supply can be set at a particular supply voltage (e.g., +15 V DC). A control line associated with the dither input component 306 can be set at a particular signal input (e.g., 50 Hz at 50% duty cycle). A control line associated with an analog input point can be set at a particular number of bits (e.g., effective number of bits), such as 10 bits, for instance.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. An apparatus, comprising:

input filter circuitry connected to an input terminal of the apparatus to provide filtering to an input signal;

current shunt circuitry connected to the input filter circuitry to create an input shunt while the apparatus is operating in a current mode to determine a current associated with the input signal;

input protection circuitry connected to the current shunt circuitry to protect the input terminal from damage;

resistance/thermistor input pull-up circuitry connected to the current shunt circuitry to provide an excitation voltage while the apparatus is operating in a resistance mode to determine a resistance associated with the input signal;

voltage/current input scaling circuitry connected to the resistance/thermistor input pull-up circuitry to provide input prescaling while the apparatus is operating in a voltage mode to determine a voltage associated with the input signal, an analog output mode to provide an analog output, a digital/pulse counting mode to determine a number of pulses received at the input terminal over a particular period of time, and the current mode;

dither input circuitry connected to the voltage/current input scaling circuitry to receive a dither signal;

pulse-width modulation (PWM) control circuitry to provide a voltage gain to the analog output while the apparatus is operating in the analog output mode; and current source circuitry to create a current source to limit a current of the analog output while the apparatus is operating in the analog output mode and to limit a wetting current while the apparatus is operating in the digital/pulse counting mode.

2. The apparatus of claim 1, wherein the apparatus is configured to control a refrigeration system.

3. The apparatus of claim 1, wherein the current shunt circuitry is configured to allow a continuous application of 28V AC to an input terminal of the apparatus without damage to the apparatus.

4. The apparatus of claim 1, wherein the analog output mode is run in a calibrated open loop mode.

5. The apparatus of claim 1, wherein the analog output mode is run using proportional-integral-derivative (PID) loop control with voltage feedback.

6. An apparatus, comprising:

a substrate; and a dual channel apparatus on the substrate, the dual channel apparatus including:

input filter circuitry connected to an input terminal of the apparatus to provide filtering to an input signal;

current shunt circuitry connected to the input filter circuitry to create an input shunt while the apparatus is operating in a current mode to determine a current associated with the input signal;

input protection circuitry connected to the current shunt circuitry to protect the input terminal from damage;

resistance/thermistor input pull-up circuitry connected to the current shunt circuitry to provide an excitation voltage while the apparatus is operating in a resistance mode to determine a resistance associated with the input signal;

voltage/current input scaling circuitry connected to the resistance/thermistor input pull-up circuitry to provide input prescaling while the apparatus is operating in a voltage mode to determine a voltage associated with the input signal, an analog output mode to provide an analog output, a digital/pulse counting mode to determine a number of pulses received at the input terminal over a particular period of time, and the current mode;

dither input circuitry connected to the voltage/current input scaling circuitry to receive a dither signal;

pulse-width modulation (PWM) control circuitry connected to the input protection circuitry to provide a voltage gain to the analog output while the apparatus is operating in the analog output mode; and current source circuitry connected to the PWM control circuitry to create a current source to limit a current of the analog output while the apparatus is operating in the analog output mode and to limit a wetting current while the apparatus is operating in the digital/pulse counting mode;

wherein the apparatus is configured to be disposed in a refrigeration rack and is configured to control a refrigeration system.

7. The apparatus of claim 6, wherein a width of the dual channel apparatus is between 0.74 and 0.76 inches, and wherein a length of the dual channel apparatus is between 2.14 and 2.16 inches.

8. The apparatus of claim 6, wherein the apparatus includes a plurality of dual channel apparatuses on the substrate.

9. The apparatus of claim 8, wherein the apparatus includes 8 dual channel apparatuses on the substrate, and wherein a width of the substrate does not exceed 5 inches and a length of the substrate does not exceed 7 inches.

10. A system, comprising:

an apparatus, including:

current source circuitry, pulse-width modulation (PWM) control circuitry, dither input circuitry, current shunt circuitry, resistance/thermistor input pull-up circuitry, voltage/current input scaling circuitry, input protection circuitry, and input filter circuitry;

a memory; and a processor configured to execute executable instructions stored in the memory to:

cause the apparatus to enable a particular mode of a plurality of modes by causing a modification of an operation of at least one of the current source circuitry, pulse-width modulation (PWM) control circuitry, dither input circuitry, current shunt circuitry, resistance/thermistor input pull-up circuitry, voltage/current input scaling circuitry, input protection circuitry, and input filter circuitry, wherein:

the input filter circuitry is connected to an input terminal of the apparatus and configured to provide filtering to an input signal;

the current shunt circuitry is connected to the input filter circuitry and configured to create an input shunt while the apparatus is operating in a current mode to determine a current associated with the input signal;

the input protection circuitry is connected to the current shunt circuitry and configured to protect the input terminal from damage;

the resistance/thermistor input pull-up circuitry is connected to the current shunt circuitry and configured to provide an excitation voltage while the apparatus is operating in a resistance mode to determine a resistance associated with the input signal;

the voltage/current input scaling circuitry is connected to the resistance/thermistor input pull-up circuitry and configured to provide input prescaling while the apparatus is operating in a voltage mode to determine a voltage associated with the input signal, an analog output mode to provide an analog output, a digital/pulse counting mode to determine a number of pulses received at the input terminal over a particular period of time, and the current mode;

the dither input circuitry is connected to the voltage/current input scaling circuitry and configured to receive a dither signal;

the pulse-width modulation (PWM) control circuitry is connected to the input protection circuitry and configured to provide a voltage gain to the analog output while the apparatus is operating in the analog output mode; and the current source circuitry is connected to the PWM control circuitry and configured to create a current source to limit a current of the analog output while the apparatus is operating in the analog output mode and to limit a wetting current while the apparatus is operating in the digital/pulse counting mode.

11. The system of claim 10, wherein the processor is configured to execute instructions stored in the memory to cause the apparatus to enable the current mode, and wherein enabling the current mode includes:

setting a logic level of the current shunt circuitry to high;

setting a logic level of the voltage/current input scaling circuitry to low;

setting a duty cycle of the PWM control circuitry to a lowest setting; and setting a logic level of the pull-up circuitry to highZ.

12. The system of claim 10, wherein the processor is configured to execute instructions stored in the memory to cause the apparatus to enable the resistance mode, and wherein enabling the resistance mode includes:

setting a logic level of the current shunt circuitry to low;

setting a logic level of the voltage/current input scaling circuitry to highZ;

setting a duty cycle of the PWM control circuitry to a lowest setting; and setting a logic level of the pull-up circuitry to high.

13. The system of claim 10, wherein the processor is configured to execute instructions stored in the memory to cause the apparatus to enable the voltage mode, and wherein enabling entering the voltage mode includes:

setting a logic level of the current shunt circuitry to low;

setting a logic level of the voltage/current input scaling circuitry to low;

setting a duty cycle of the PWM control circuitry to a lowest setting; and setting a logic level of the pull-up circuitry to highZ.

14. The system of claim 10, wherein the processor is configured to execute instructions stored in the memory to cause the apparatus to enable the digital/pulse counting mode, and wherein enabling the digital/pulse counting mode includes:

setting a logic level of the current shunt circuitry to low;

setting a logic level of the voltage/current input scaling circuitry to low;

setting a duty cycle of the PWM control circuitry to a particular percentage based on a determined wetting voltage; and setting a logic level of the pull-up circuitry to highZ.

15. The system of claim 10, wherein the processor is configured to execute instructions stored in the memory to cause the apparatus to enable the analog output mode, and wherein enabling the analog output mode includes:

setting a logic level of the current shunt circuitry to low;

setting a logic level of the voltage/current input scaling circuitry to low;

setting a duty cycle of the PWM control circuitry to a particular percentage based on an analog output set point; and setting a logic level of the pull-up circuitry to low.

16. The system of claim 10, wherein each of the plurality of modes is enabled using a same terminal of the apparatus.

17. The system of claim 10, wherein the processor is remote with respect to the apparatus.

18. The system of claim 10, wherein the system is configured to control one of a refrigeration system and a heating, ventilation, and air conditioning system.

* * * * *